(12) United States Patent
Patel et al.

(10) Patent No.: US 7,870,227 B2
(45) Date of Patent: Jan. 11, 2011

(54) SYSTEM AND METHOD FOR MERGING INTERNET PROTOCOL ADDRESS TO LOCATION DATA FROM MULTIPLE SOURCES

(75) Inventors: Devesh Patel, Cupertino, CA (US); Soren Riise, Cupertino, CA (US); Li Yue, Princeton, NJ (US); Ramesh Pai, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 577 days.

(21) Appl. No.: 11/831,331

(22) Filed: Jul. 31, 2007

(65) Prior Publication Data

US 2009/0037602 A1 Feb. 5, 2009

(51) Int. Cl.
*G06F 15/173* (2006.01)
(52) U.S. Cl. ...................................... 709/218
(58) Field of Classification Search .................. 709/218, 709/217, 203
See application file for complete search history.

(56) References Cited

U.S. PATENT DOCUMENTS

| | | | |
|---|---|---|---|
| 5,948,061 A * | 9/1999 | Merriman et al. ........... 709/219 |
| 6,757,740 B1 * | 6/2004 | Parekh et al. ............... 709/245 |
| 7,376,714 B1 * | 5/2008 | Gerken ........................ 709/219 |
| 7,403,978 B2 * | 7/2008 | Parekh et al. ............... 709/217 |
| 7,486,943 B2 * | 2/2009 | Choti et al. .............. 455/404.2 |

OTHER PUBLICATIONS

U.S. Appl. No. 10/982,629, Soren Riise et al., filed Nov. 4. 2003.
U.S. Appl. No. 10/745,094, Soren Riise et al., filed Dec. 22, 2003.
U.S. Appl. No. 10/745,093, Soren Riise et al., filed Dec. 22, 2003.
U.S. Appl. No. 10/680,495, Soren Riise et al., filed Oct. 7, 2003.

* cited by examiner

*Primary Examiner*—David Y Eng
(74) *Attorney, Agent, or Firm*—Brinks Hofer Gilson & Lione

(57) ABSTRACT

Systems and methods for associating a geographic location with an Internet protocol (IP address) are disclosed. Generally, an IP address to location module determines whether a geographic location is associated with a common IP address in a majority of IP address to location data sets. The IP address to location module then stores an association between a geographic location and the IP address in a master IP address to location data set based on whether a geographic location is associated with a common IP address in a majority of IP address to location data sets.

9 Claims, 14 Drawing Sheets

US 7,870,227 B2

SYSTEM AND METHOD FOR MERGING INTERNET PROTOCOL ADDRESS TO LOCATION DATA FROM MULTIPLE SOURCES

RELATED APPLICATIONS

The present application is related to U.S. patent application Ser. No. 11/729,365 (still pending), filed Mar. 28, 2007; U.S. patent application Ser. No. 11/729,364 (still pending), filed Mar. 28, 2007; and U.S. patent application Ser. No. 11/729,377 (still pending), filed Mar. 28, 2007, each of which are assigned to Yahoo! Inc., the entirety of each of which is hereby incorporated by reference.

BACKGROUND

Devices such as personal computers, servers, and handheld devices that access computer networks utilizing protocols such as the TCP/IP protocol are typically assigned an Internet Protocol Address ("IP address") that identifies the device. An IP address is a unique number that may be assigned to a single device, or is shared by multiple client devices, and provides the ability to route data over a network to and from a specific device.

Internet standards governing bodies such as the American Registry for Internet Numbers ("ARIN") provide blocks of IP addresses to Internet service providers. When a user provided Internet service by an Internet service provider interacts with webpages available on the Internet, the user sends various requests to a website provider that include an IP address of the block of IP addresses provided to the Internet service provider. Because the Internet service provider may provide Internet service to more users than the number of IP addresses provided to the Internet service provider, it may appear that more than one user is using a single IP address. Thus, it is often difficult to determine a location of a user submitting a request based on an IP address associated with the user because many different users in different geographic locations may use the same IP address.

Internet search engines such as Yahoo!, and online advertisement service providers such as Yahoo! Search Marketing, often desire to determine a location of a user submitting a search query, or a location of a user receiving a digital ad, so that the Internet search engine or the online advertisement service provider can better tailor search results or digital ads to the potential interests of a user. For example, depending on a local intent of a search query, an Internet search engine may desire to serve search listings with information specifically tailored to the location of the user. Similarly, an online advertisement service provider may desire to serve digital ads such as banner ads or sponsored search listings to a user regarding a store, or products and services, that are actually located near a user receiving the digital ad.

Due to the increased interest in targeting search results and digital ads based on a location of a user, improved methods for determining a location of a user based on an IP address received with a search query or a digital ad request are desirable.

DETAILED DESCRIPTION OF THE DRAWINGS

The present disclosure is directed to systems and methods for associating a geographic location with an IP address, and systems and methods for merging IP address to location data from multiple sources. Providing reliable information that associates a geographic location with an IP address provides Internet search engines and online advertisement service providers ("ad providers") the ability to better target search results and digital ads based on a location of a user. The present disclosure describes systems and methods for associating a geographic location with an IP address based on, e.g., user activity associated with registered users, user activity associated with browser cookies, and a local intent of search queries received at a search engine. The present disclosure additionally describes systems and methods for merging IP address to location data from multiple sources such as IP address to location data based on, e.g., user activity associated with registered users, user activity associated with browser cookies, and a local intent of search queries received at a search engine.

Figure 1:
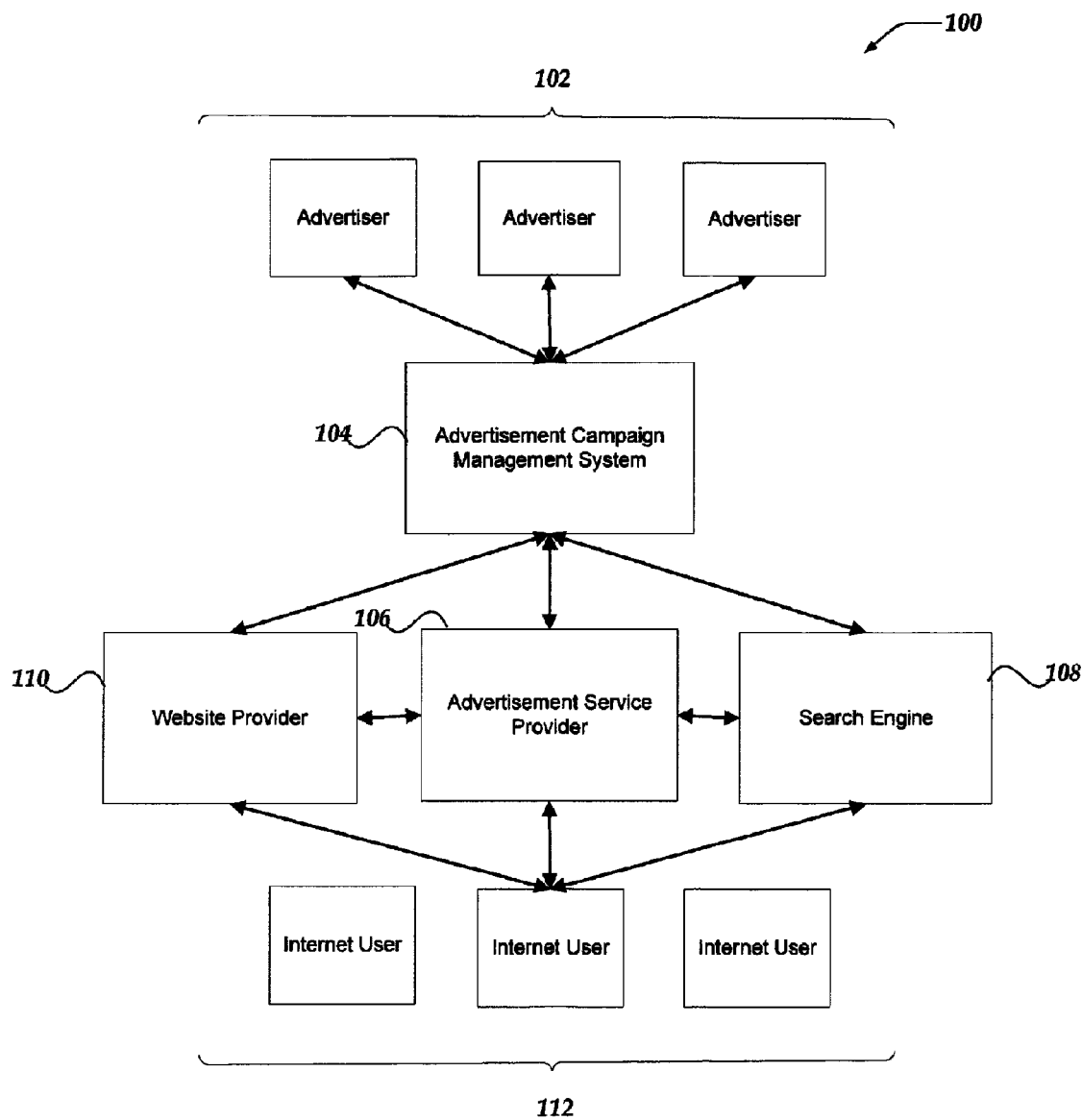
FIG. 1 is a block diagram of one embodiment of an environment in which systems and methods for associating a geographic location with an IP address and, systems and methods for merging IP addresses to location data from multiple sources, may operate.

FIG. 1 is a block diagram of one embodiment of an environment in which systems and methods for associating a geographic location with an IP address and, systems and methods for merging IP addresses to location data from multiple sources, may operate. However, it should be appreciated that the systems and methods described below are not limited to use with a search engine or pay-for-placement online advertising. The environment 100 includes a plurality of advertisers 102, an ad campaign management system 104, an ad provider 106, a search engine 108, a website provider 110, and a plurality of Internet users 112. Generally, an advertiser 102 bids on terms and creates one or more digital ads by interacting with the ad campaign management system 104 in communication with the ad provider 106. The digital ad may be a graphical banner ad that appears on a website viewed by Internet users 112, a sponsored search listing that is served to an Internet user 112 in response to a search performed at a search engine 108, a video ad, a graphical banner ad based on a sponsored search listing, and/or any other type of online marketing media known in the art.

When an Internet user 112 performs a search at a search engine 108, the search engine 108 typically receives a search query and an IP address associated with the search query. In response to the search query, the search engine 108 returns search results including one or more search listings based on search terms within the search query provided by the Internet user 112. Additionally, the ad provider 106 may serve one or more digital ads created using the digital ad campaign management system 104 to the Internet user 112 based on search terms within the search query provided by the Internet user 112.

Similarly, when an Internet user 112 requests a website served by the website provider 110, the ad provider 106 receives a digital ad request. The digital ad request may include data such as keywords obtained from content of the website and an IP address. In response to the digital ad request, the ad provider 106 serves one or more digital ads created using the ad campaign management system 104 to the Internet user 112 based on the keywords within the digital ad request.

When the search engine 108 serves search listings, or the digital ad provider 106 serves digital ads, the search engine 108, the ad campaign management system 104, and/or the ad provider 106 typically record and process information associated with the served search listings or digital ads. For example, the search engine 108, the ad campaign management system 104, and/or the ad provider 106 may record the search terms that caused the search engine 108 to serve the search listings; the search terms that caused the ad provider 106 to serve the digital ads; whether the Internet user 112 clicked on a URL associated with a served search listing or a served digital ad; what search listings or digital ads the search engine 108 and/or the ad provider 106 served with each search listings or digital ad; a rank or position of a digital ad when the Internet user 112 clicked on the digital ad; and/or for each search listing or digital ad, whether an Internet user 112 clicked on a different search listing or digital ad served at the same time. One example of an ad campaign management system that may perform these types of actions is disclosed in U.S. patent application Ser. No. 11/413,514, filed Apr. 28, 2006, and assigned to Yahoo! Inc.

Figure 9:
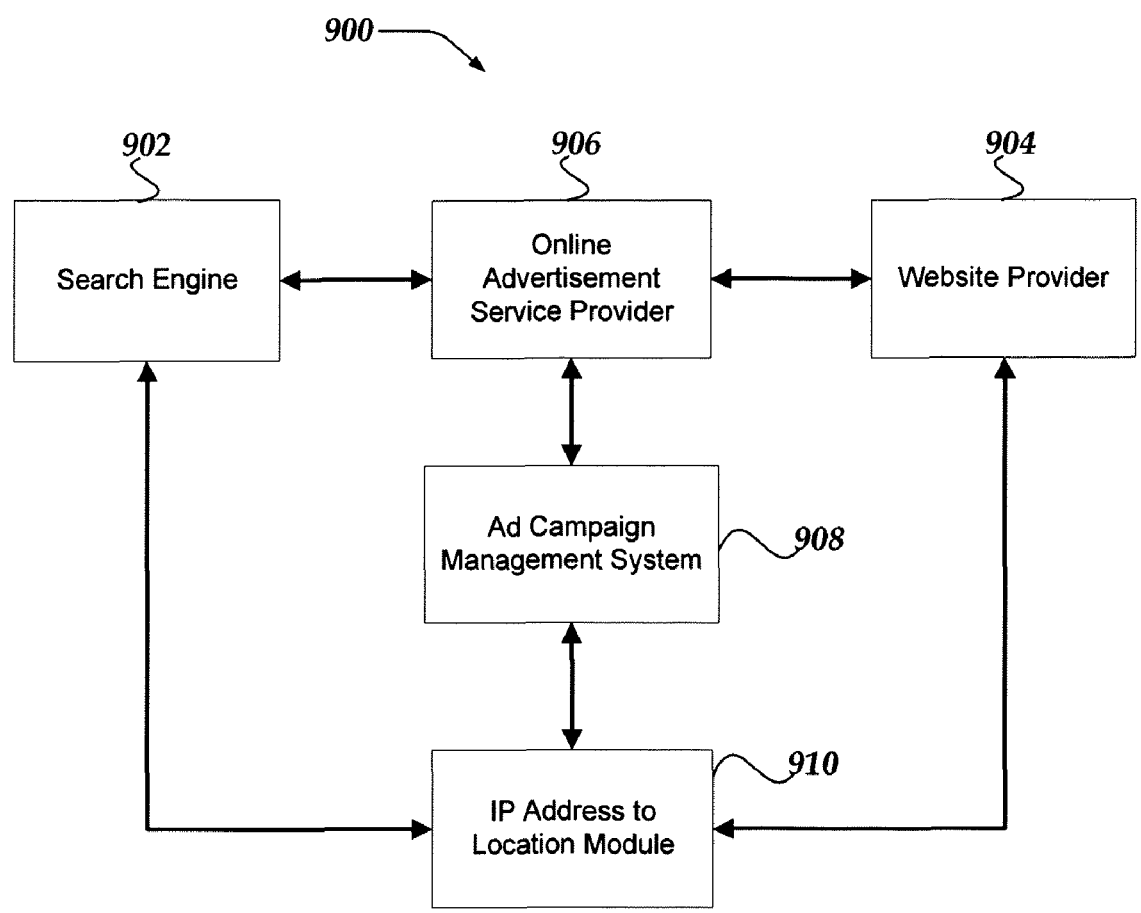
FIG. 9 is a block diagram of one embodiment of a system for associating a geographic location with an IP address based on user activity associated with browser cookies.
Figure 10:
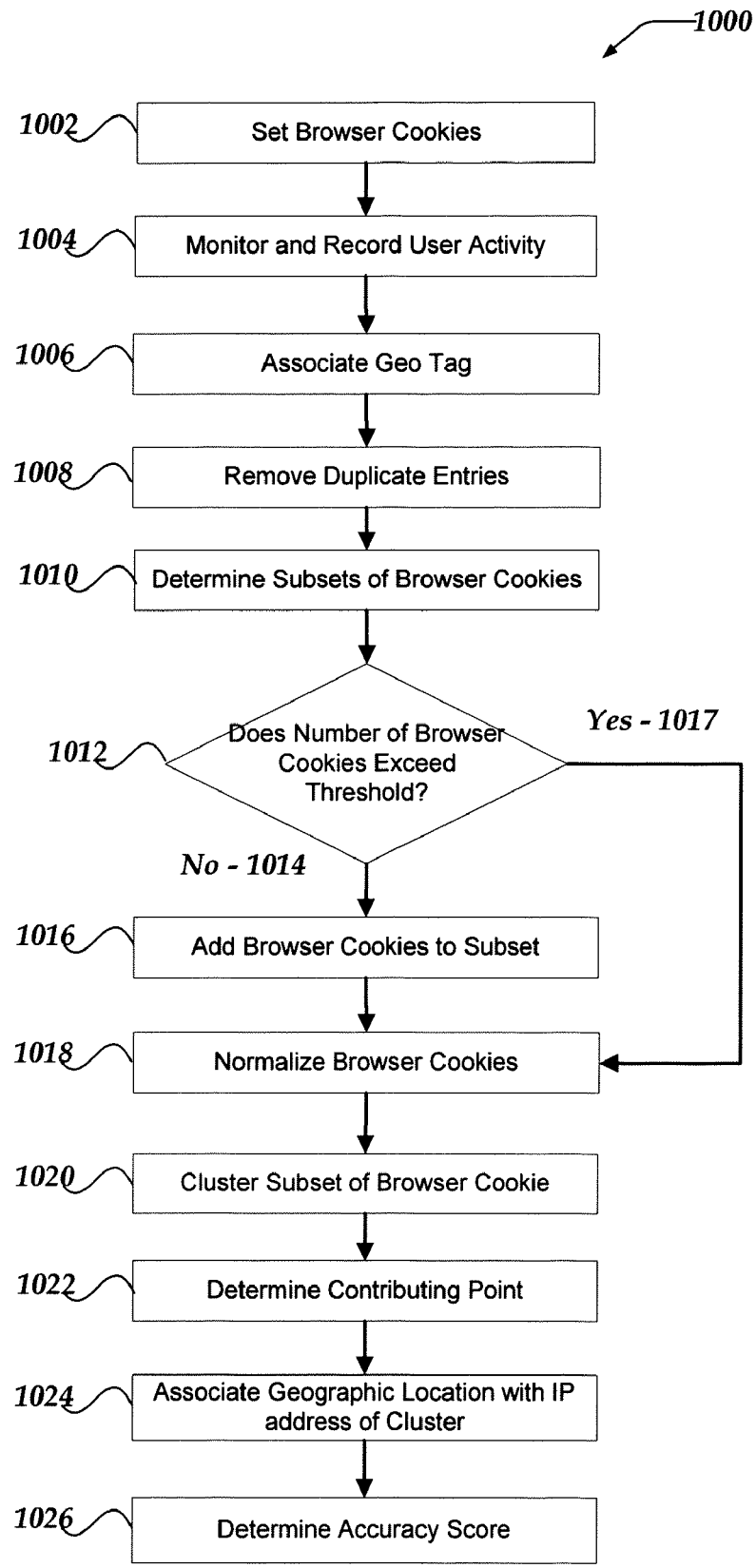
FIG. 10 is a flow chart of one embodiment of a method for associating a geographic location with an IP address based on user activity associated with browser cookies.
Figure 11:
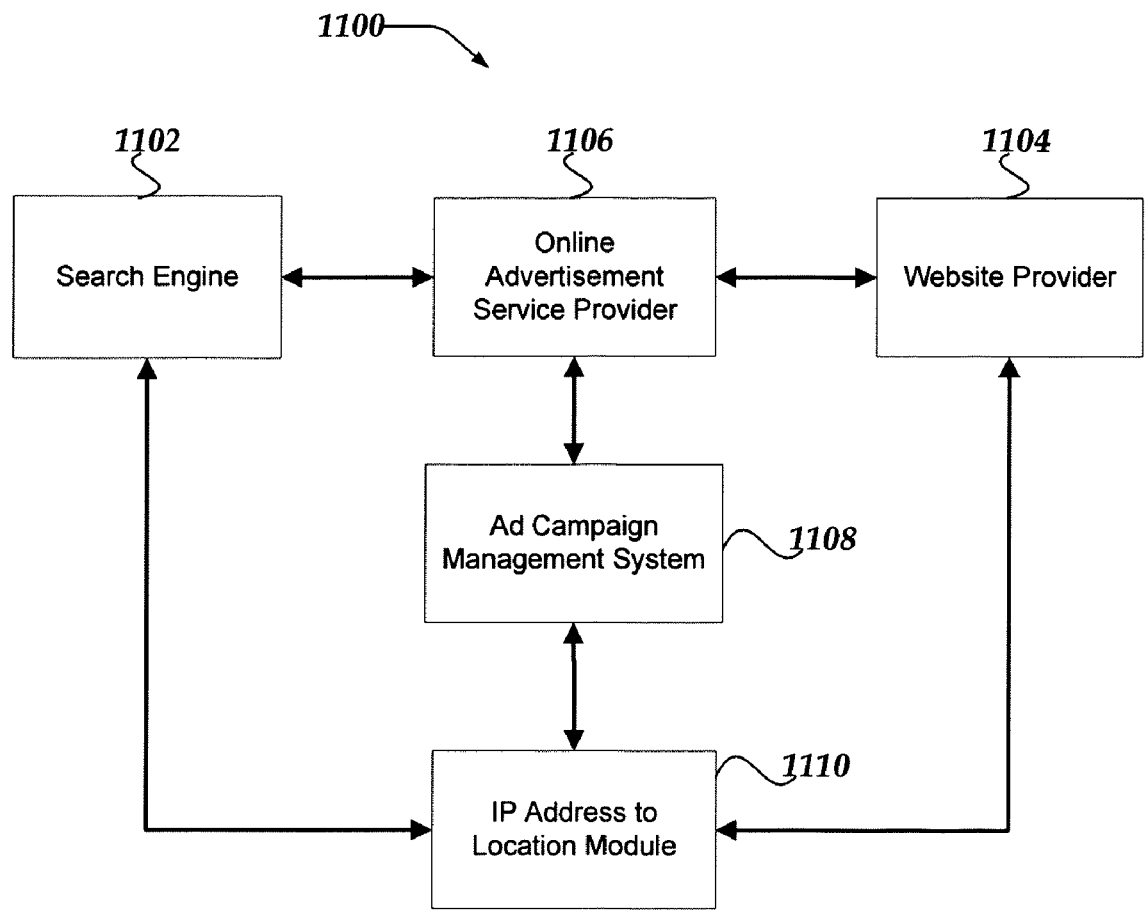
FIG. 11 is a block diagram of one embodiment of a system for associating a geographic location with an IP address based on a local intent of search queries received at a search engine.
Figure 12:
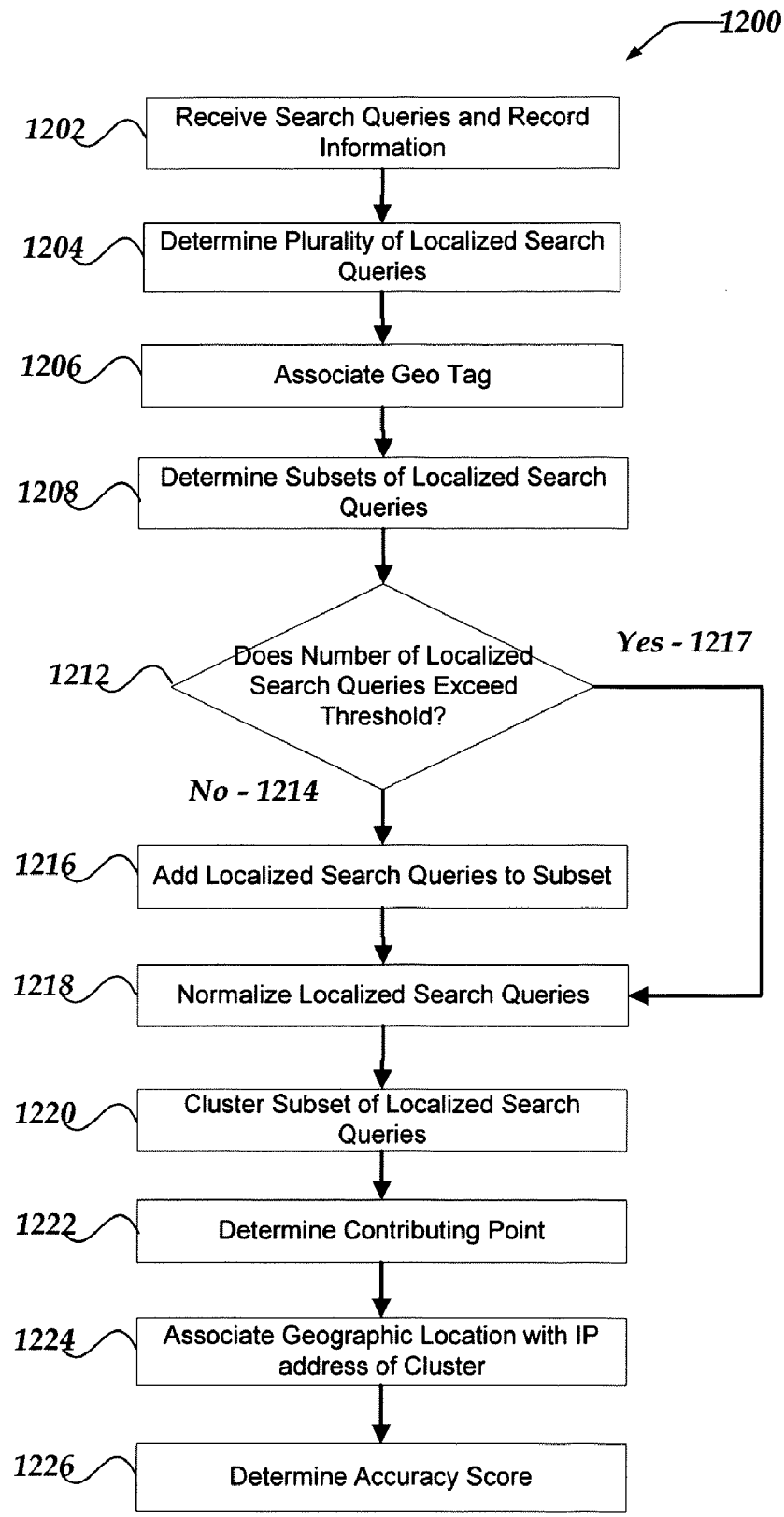
FIG. 12 is a flow chart of one embodiment of a method for associating a geographic location with an IP address based on a local intent of search queries received at a search engine.
Figure 13:
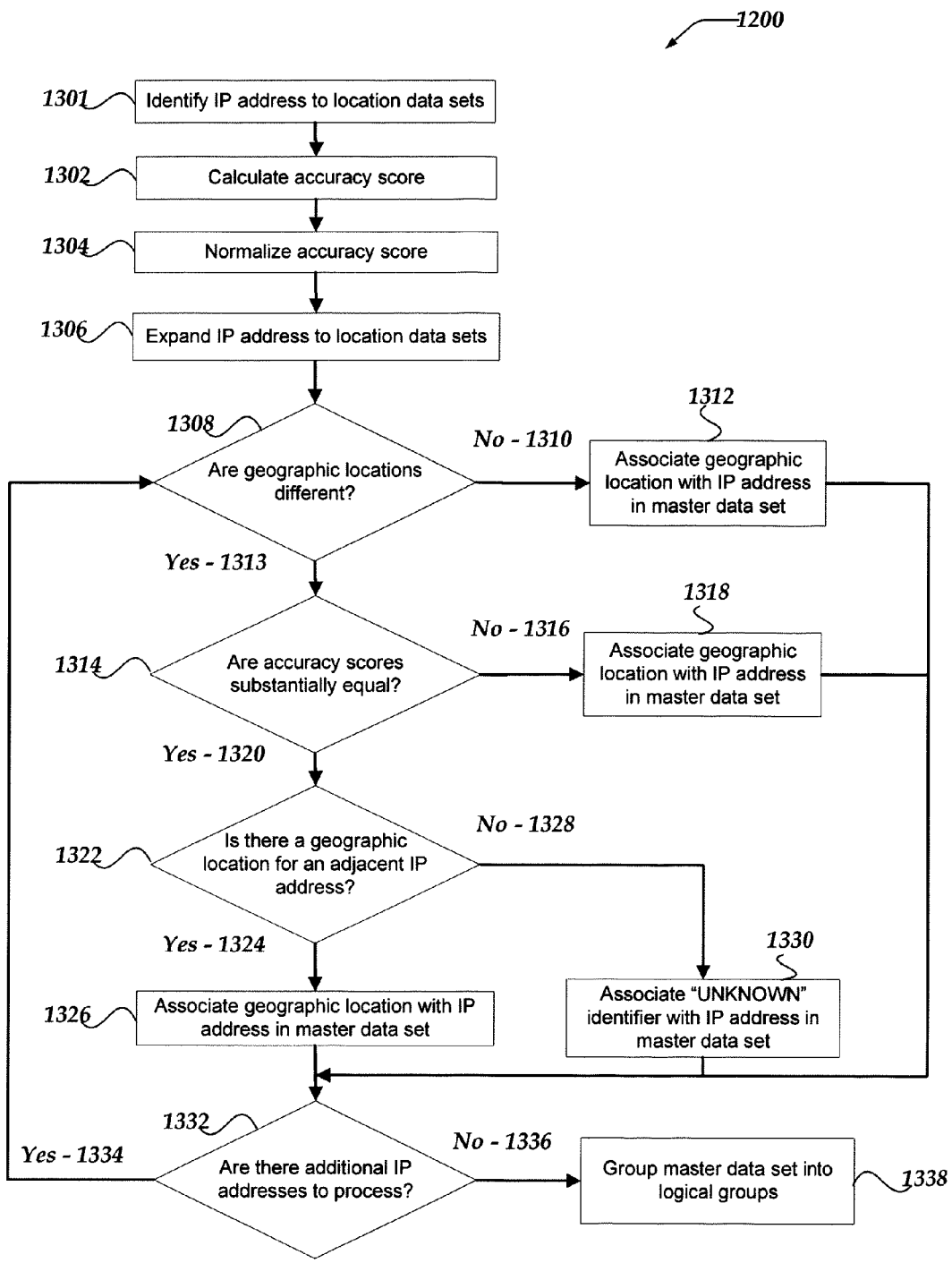
FIG. 13 is a flow chart of one embodiment of a method for merging IP address to location data from multiple sources.
Figure 14:
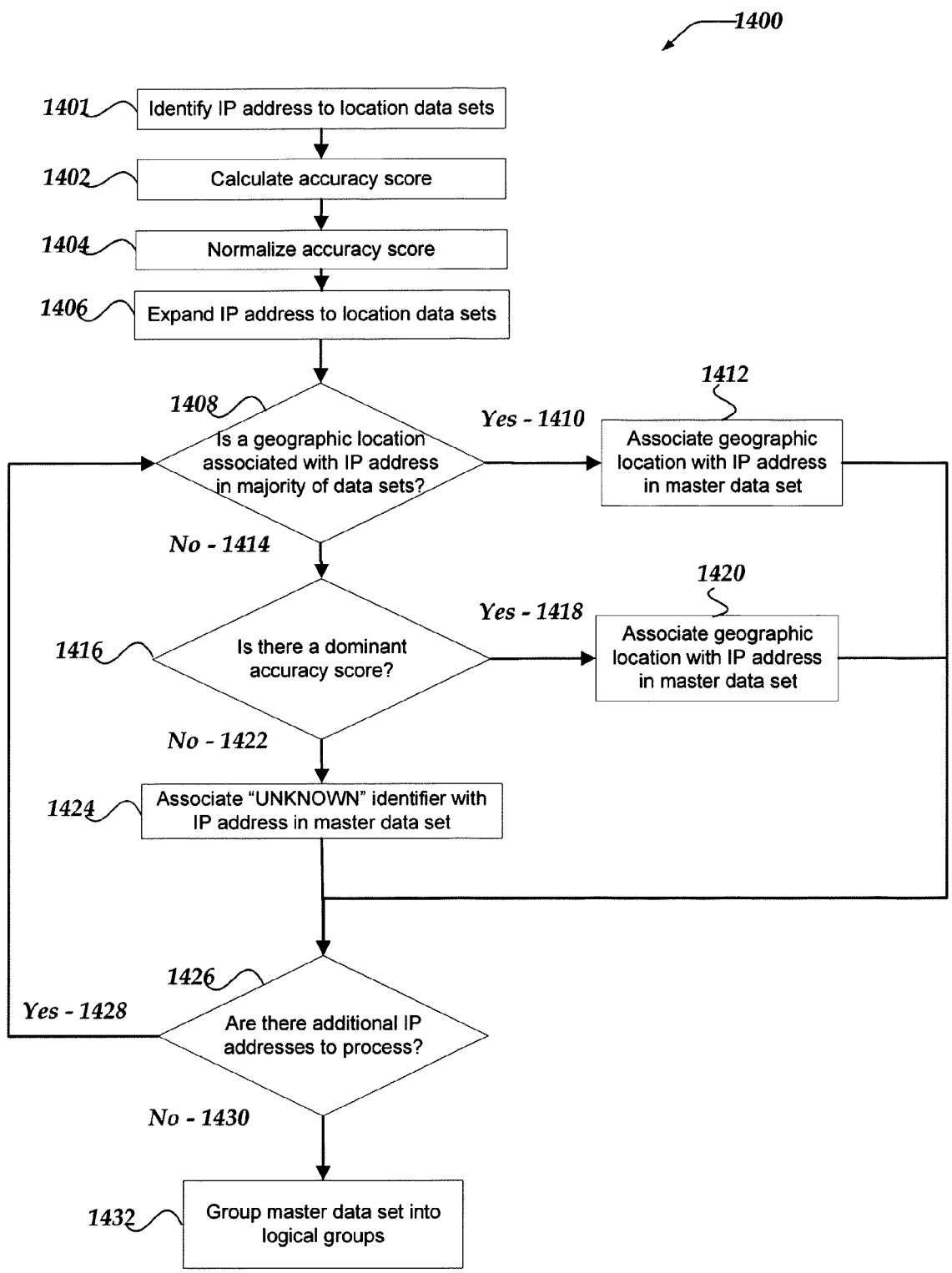
FIG. 14 is a flow chart of another embodiment of a method for merging IP address to location data from multiple sources.

In processing information associated with served search listings or digitals ads, the search engine 108, the ad campaign management system 104, the ad provider 106, and/or another module of the search engine 108 or the ad provider 106 may associate a geographic location with an IP address based on IP addresses received with search queries or digital ad requests. The description below describes at least three different systems and methods for associating a geographic location with an IP address. Generally, FIGS. 2-8 illustrate systems and methods for associating a geographic location with an IP address based on user activity associated with registered users. FIGS. 9 and 10 illustrate systems and methods for associating a geographic location with an IP address based on user activity associated with browser cookies. FIGS. 11 and 12 illustrate systems and methods for associating a geographic location with an IP address based on a local intent of search queries received at a search engine. FIGS. 13 and 14 illustrate methods for merging IP address to location data from multiple sources.

Figure 2:
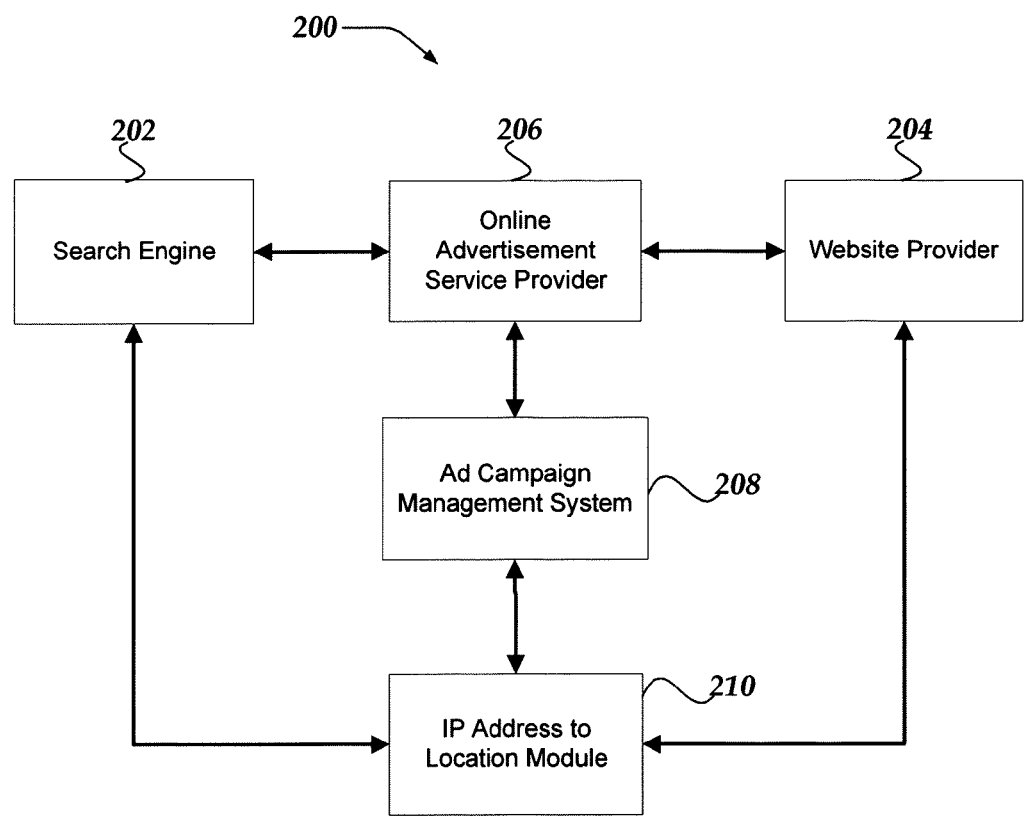
FIG. 2 is a block diagram of one embodiment of a system for associating a geographic location with an IP address based on user activity associated with registered users.

FIG. 2 is a block diagram of one embodiment of a system for associating a geographic location with an IP address based on user activity associated with registered users. Generally, the system 200 includes a search engine 202, a website provider 204, an ad provider 206, an ad campaign management system 208, and an IP address to location module 210. In some implementations the IP address to location module 210 may be part of the search engine 202 and/or the ad provider 206. However, in other implementations, the IP address to location module 210 is distinct from the search engine 202 and/or the ad provider 206. Typically the search engine 202, website provider 204, ad provider 206, ad campaign management system 208, and IP address to location module 210 communicate with one another over one or more external or internal networks. The search engine 202, website provider 204, ad provider 206, ad campaign management system 208, and IP address to location module 210 may be implemented as software code stored on a computer-readable medium and running in conjunction with a processor such as a personal computer, a single server, a plurality of servers, or any other type of computing device known in the art.

Search engines 202 and website providers 204 often provide the opportunity for a user to register with the search engine 202 and/or website provider 204. Typically, as part of the process for registering with the search engine 202 and/or website provider 204, a user will provide demographic information such as the user's gender, age, occupation, income level, home address, and/or business address. To encourage a user to register, search engines 202 and/or website providers 204 may provide the user with access to a free email account, special advertisements or discounts available only to registered users, access to restricted webpages available only to registered users, or any other incentive a search engine 202 and/or website provider 204 may desire to provide to registered users. When a user is registered, the search engine 202 and/or website provider 204 provide the registered user with a unique identifier which allows the search engine 202 and/or website provider 204 to monitor and record the activity of the registered user. For example, the search engine 202 and/or website provider 204 may monitor the types of search queries submitted by the registered user, the webpages the registered user visits, what products and services the registered user purchases, or any other user activity on the Internet that may be useful to the search engine 202 and/or website provider 204.

In addition to the information recited above, the search engine 202 and/or website provider 204 may monitor and record IP addresses associated with the activity of registered users. The IP address to location module 210 processes the recorded user activity and the IP address associated with the activity of the registered user for a plurality of registered users to associate a geographic location with an IP address.

Figure 3:
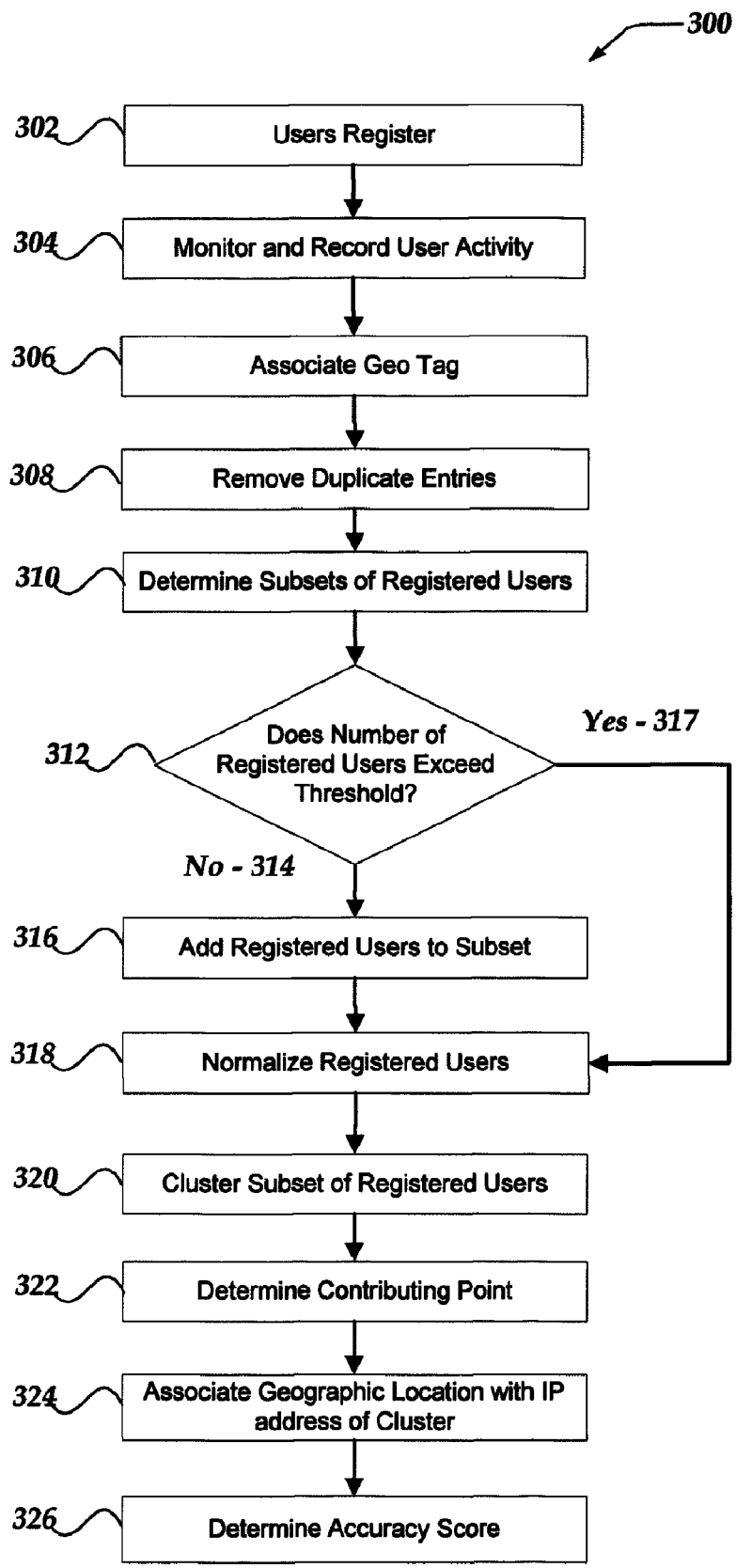
FIG. 3 is a flow chart of one embodiment of a method for associating a geographic location with an IP address based on user activity associated with registered users.

FIG. 3 is a flow chart of one embodiment of a method for associating a geographic location with an IP address based on user activity associated with registered users. The method 300 begins with a plurality of users interacting with a search engine and/or a website provider to register with the search engine or website site provider at step 302. As described above, the users provide demographic information when registering such as a home address of the user. The search engine and/or website provider monitor and record the user activity of the plurality of registered users at step 304. For example, the search engine and/or website provider may monitor and record the types of search queries submitted by each registered user, the webpages each registered user visits, the products and service each registered user purchases, and the IP address associated with each registered user. In one implementation, the search engine and/or website provider record the user activity in search logs.

Systems such as an IP address to location module associate a geo tag with each of the registered users at step 306 based on the location of the user provided during registration. Generally, a geo tag may be an identifier assigning a longitude and latitude coordinate to a geographic location such as a home address or a business address associated with the registered user. Examples of systems and methods for indexing data such as associating a geo tag with a geographic location associated with a user are disclosed in U.S. patent application Ser. No. 10/982,629, filed Nov. 4, 2004 and assigned to Yahoo! Inc., the entirety of which is hereby incorporated by reference.

In some implementations, the IP address to location module reviews records associated with the plurality of registered users to remove any duplicate entries for one user having multiple registered accounts at step 308. After removing any duplicate entries, the IP address to location modules identifies one or more subsets of the plurality of registered users at step 310. Each subset of the plurality of registered users is associated with the same IP address, or a defined range of IP addresses.

The IP address to location module examines a subset of the plurality of registered users to determine a geographic location associated with the IP address, or defined range of IP addresses, of the subset. Initially, the IP address to location module may examine the number of registered users in the subset to determine if the number of registered users in the subset exceeds a quorum threshold at step 312. The quorum threshold is a number of registered users that should be present in the subset to accurately associate a geographic location with an IP address. In one implementation, the quorum threshold may be set at 50 registered users, but the quorum threshold may be set at any number of users.

If the IP address to location module determines that the number of registered users in the subset does not exceed the quorum threshold (314), the IP address to location module may add registered users to the subset that are associated with an adjoining IP address at step 316 so that the number of registered users in the subset exceeds the quorum threshold. Typically an IP address adjoins another IP address when it is the numerically closest IP address within the same Class-C subnet as the original IP address. As known in the art, a Class-C subnet is an IP address block consisting of 256 consecutive addresses. In some implementations, any registered users added to the subset must be associated with an IP address that is in the same Class-C subnet as the original IP address because different Class-C IP addresses have a high risk of being routed differently.

In some implementations, the IP address to location module may limit the number of registered users added to the subset to a predefined ceiling. For example, the numbered of registered users added to a subset may not be more than 25% of the total number of registered users in the subset.

If the IP address to location module determines the number of registered users in the subset exceeds the quorum threshold (317), or after adding registered users to the subset so that the number of registered users in the subset exceeds the quorum threshold at step 316, the method proceeds to step 318. In some implementations, the IP address to location module may normalize a weight associated with registered users at step 318. Normalizing a weight associated with registered users allows the IP address to location module to adjust the weight of each registered user in determining a geographic location associated with an IP address based on factors such as a population of a geographic location associated with a registered user. If the weight associated with registered users is not normalized, it is likely that a geographic location associated with an IP address will regularly be biased towards a geographic location with a high population density, such as a large city. To address this issue, the IP address to location module may normalize a weight associated with each registered user so that registered users located in a highly populated area have less weight in determining a geographic location associated with an IP address than registered users located in sparsely populated areas. However, in other implementations, the IP address to location module does not normalize a weight associated with the registered users so that each user has the same weight in determining a geographic location associated with the IP address.

The IP address to location module creates a spatial cluster for the subset at step 320. In one implementation, the IP address to location module creates a spatial cluster for the subset based on registered users of the subset that have a geo tag located within a predefined distance of a geo tag of another registered user of the cluster. In one implementation, the predefined distance may be 30 miles. However, any predefined distance may be used. The IP to location module may set the predefined distance based on factors such as a granularity of user data available, e.g. a street address or zipcode associated with a registered user; a population density association with a geographic location associated with a registered user; adjacency relationships, such as those described in U.S. patent application Ser. No. 10/982,629, relating to distances between adjacent zip codes; or any other factor desired by the IP to location module. In other implementations, other algorithms for creating spatial clusters known in the art may be used.

Figure 4:
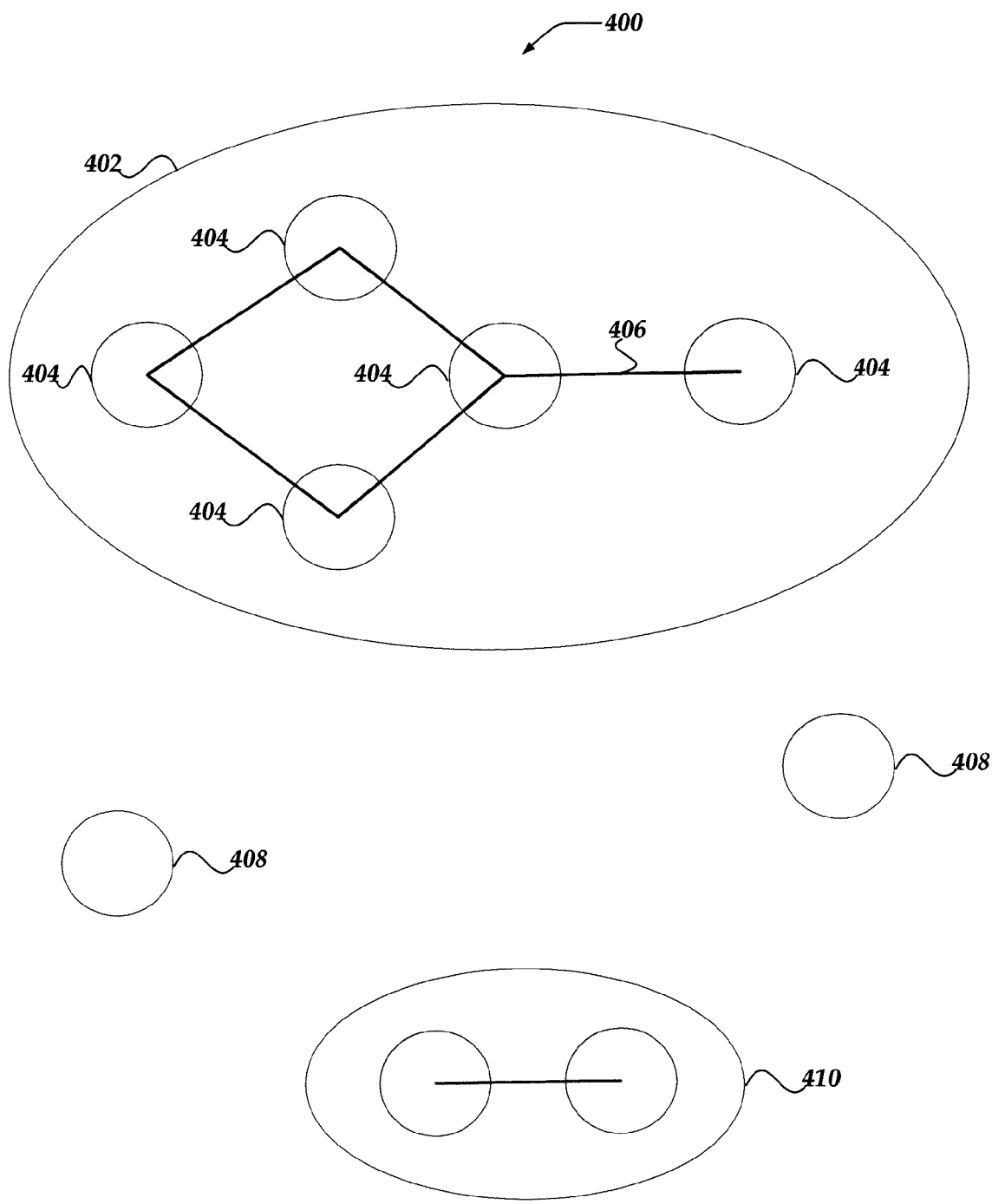
FIG. 4 is a diagram illustrating the creation of a spatial cluster.

FIG. 4 is a diagram illustrating how an IP address to location module may create a spatial cluster for one subset. The spatial cluster is created to determine a general location with the most number of registered users within a defined distance of one another that are associated with the same IP address, or defined range of IP addresses. The IP address to location module creates a spatial cluster 402 including a plurality of registered user 404 that are associated with a geo tag located within a predefined distance 406 of a geo tag of another registered user of the cluster. It will be appreciated that the IP address to location module does not include registered users 408 that are not within the predefined distance 406. Additionally, the IP address to location module does not include minor clusters 410. Generally, Minor clusters 410 include fewer registered users than the spatial cluster 402, and include registered users that are associated with a geo tag that is located within a predefined distance of a geo tag of another registered user of the minor cluster 410 but that is not located within a predefined distance of a geo tag of a registered user of the spatial cluster 410.

Referring again to FIG. 3, after the IP address to location module creates a spatial cluster for the subset at step 320, the IP address to location module determines a contributing point near the geographic center of the cluster at step 322. In one implementation, the IP address to location module determines a contributing point by determining a geographic location, such as a longitude and latitude, that is associated with more registered users of the cluster than any other geographic location. However, when two or more geographic locations are equally associated with more registered users of the cluster than any other geographic location, the IP address to location module determines a contributing point to be the geographic location that is closest to the average of all of the geographic locations associated with registered users of the cluster, for example, with respect to longitude and latitude coordinates, the IP address to location module would determine the contributing point to be the geographic location associated with a registered user of the cluster that is closest to the average longitude and latitude of all of the longitudes and latitudes associated with registered users of the cluster.

The IP address to location module assigns a geographic location associated with the determined geographic center of the cluster (the contributing point) to the IP address, or defined range of IP addresses, shared by the registered users of the cluster at step 324. The geographic location associated with the geographic center of the cluster may be a street, a zip code, a neighborhood, a city, a state, a DMA, or any other geographic location. For example, if all registered users of a cluster are associated with a single IP address, the IP location module may assign a zip code associated with the determined geographic center of the cluster (the contributing point) with the single IP address. Similarly, if all registered users of a cluster are associated with one of two sequential IP addresses, the IP location module may assign a zip code associated with the determined geographic center of the cluster (the contributing point) with the two sequential IP addresses.

The IP address to location module may determine an accuracy score at step 326 for the association of the geographic location with the IP address, or defined range of IP addresses, shared by the registered users of the cluster at step 324. The IP address to location module may determine the accuracy score on a street level, a zip code level, a city level, a DMA level, a state level, a country level, or any other geographic level desired by a search engine and/or web provider.

Figure 5:
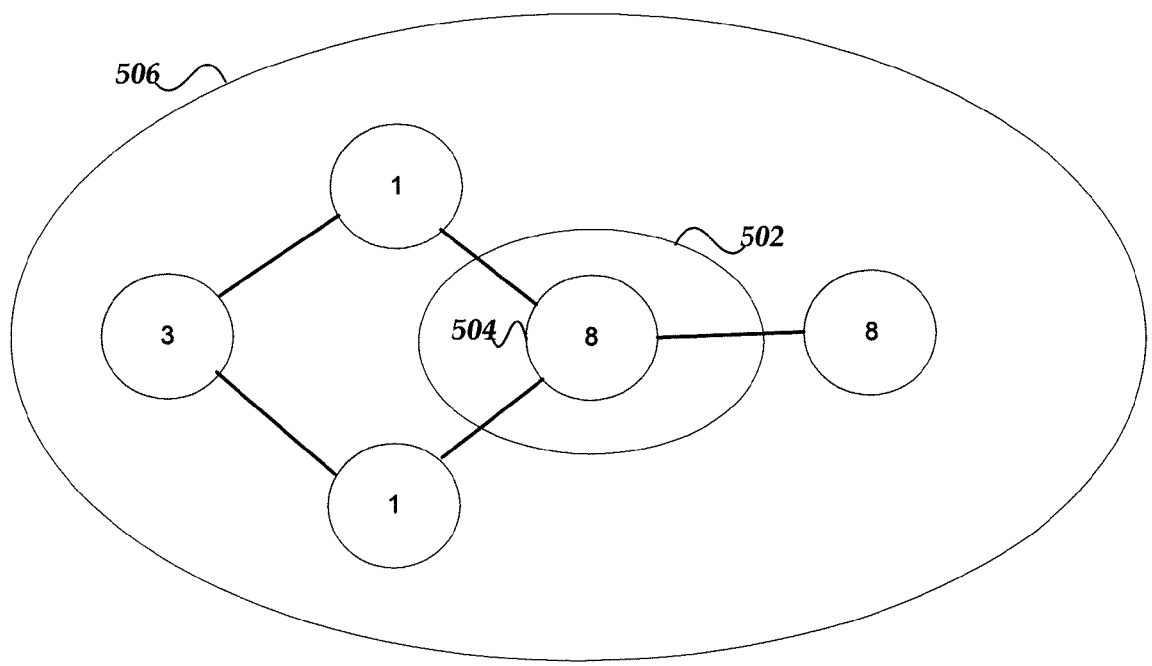
FIG. 5 is a diagram illustrating one method for determining an accuracy score at a zip code level of an association of a geographic location with an IP address.

FIG. 5 is a diagram illustrating one method for determining an accuracy score on a zip code level of an association of a geographic location associated with the determined geographic center of a cluster (the contributing point) with the IP address, or defined range of IP addresses, shared by the registered users of the cluster. Generally, an accuracy score on a zip code level is determined by dividing a total number of registered users of the cluster in a zip code 502 that is also the zip code associated with the determined geographic center 504 of the cluster 506 by the total number of registered users in the cluster 506.

In FIG. 5, eight registered users of the cluster are in the zip code 502 that is also the zip code associated with the determined geographic center 504 of the cluster 506. Further, there is a total of twenty-one registered users in the cluster 506. Therefore, the accuracy score is determined by dividing eight by twenty-one. Accordingly, the accuracy score on a zip code level of the geographic location associated with the IP address, or defined range of IP addresses, shared by the registered users of the cluster 506 is 38.1%.

Figure 6:
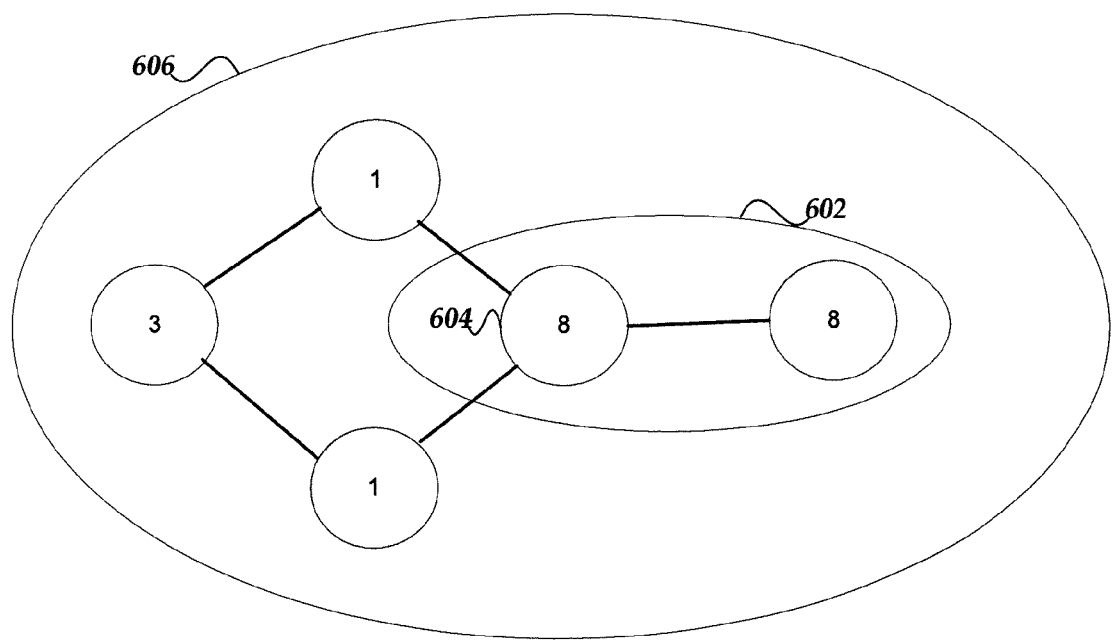
FIG. 6 is a diagram illustrating one method for determining an accuracy score at a city level of an association of a geographic location with an IP address.

FIG. 6 is a diagram illustrating one method for determining an accuracy score on a city level of an association of a geographic location associated with the determined geographic center of the a cluster (the contributing point) with the IP address, or defined range of IP addresses, shared by the registered users of the cluster. Generally, an accuracy score on a city level is determined by dividing a total number of registered users of the cluster in a city 602 that is also the city associated with the determined geographic center 604 of the cluster 606 by the total number of registered users in the cluster 606.

In FIG. 6, sixteen registered users of the cluster are in the city 602 that is also the city associated with the determined geographic center 604 of the cluster 606. Further, there is a total of twenty-one registered users in the cluster 606. Therefore, the accuracy score is determined by dividing sixteen by twenty-one. Accordingly, the accuracy score on a city level of the geographic location associated with the IP address, or defined range of IP addresses, shared by the resisted users of the cluster 606 is 76.2%

Figure 7:
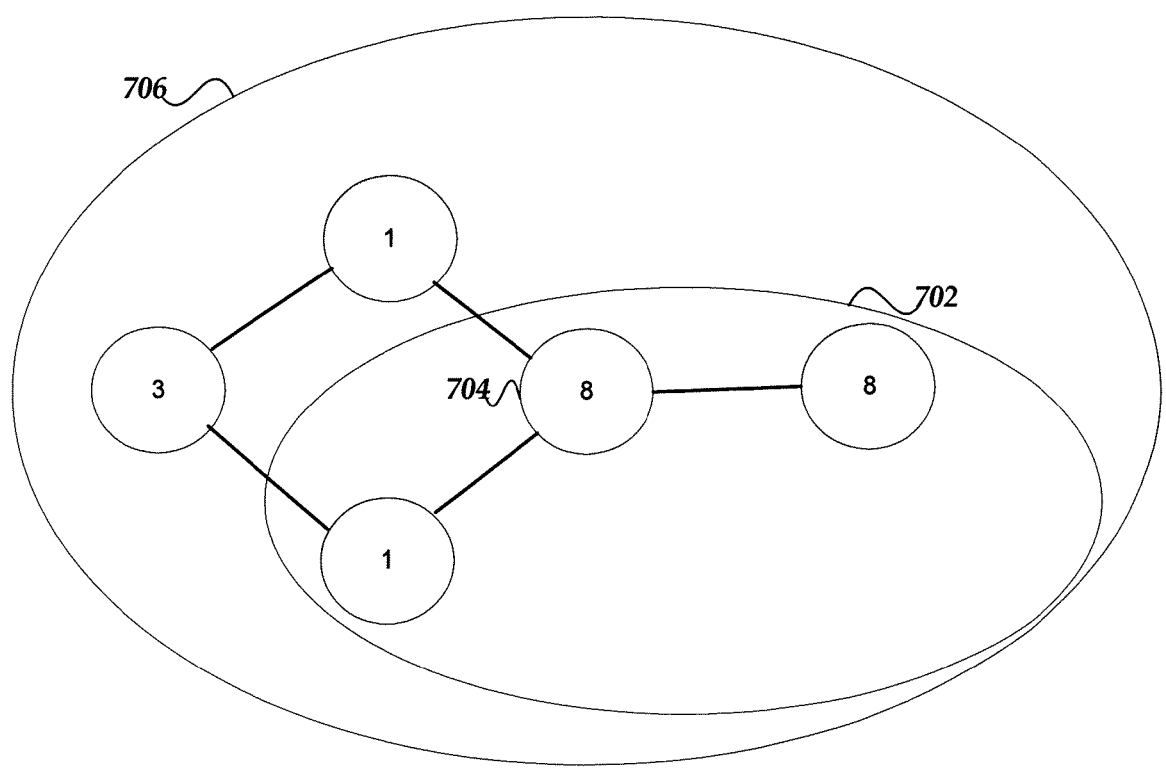
FIG. 7 is a diagram illustrating one method for determining an accuracy score at a designated market area ("DMA") level of an association of a geographic location with an IP address.

FIG. 7 is a diagram illustrating one method for determining an accuracy score on a DMA level of an association of a geographic location associated with the determined geographic center of a cluster (the contributing point) with the IP address, or defined range of IP addresses, shared by the registered users of the cluster. Generally, an accuracy score on a DMA level is determined by dividing a total number of registered users of the cluster in a DMA 702 that is also the DMA associated with the determined geographic center 704 of the cluster 706 by the total number of registered users in the cluster 706.

In FIG. 7, seventeen registered users of the cluster are in the DMA that is also the DMA associated with the determined geographic center 704 of the cluster 706. Further, there is a total of twenty-one registered users in the cluster 706. Therefore, the accuracy score is determined by dividing seventeen by twenty-one. Accordingly, the accuracy score on a DMA level of the geographic location associated with the IP address, or defined range of IP addresses, shared by the registered users of the cluster 706 is 80.9%.

Figure 8:
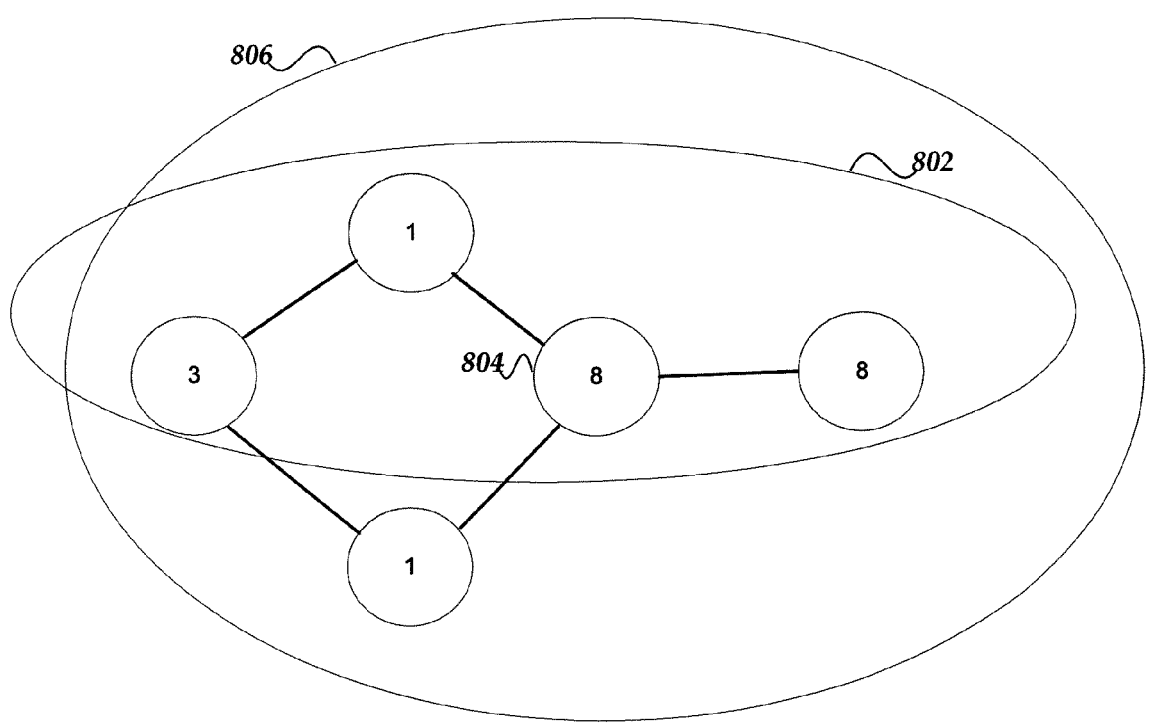
FIG. 8 is a diagram illustrating one method for determining an accuracy score at a state level of an association of a geographic location with an IP address.

FIG. 8 is a diagram illustrating one method for determining an accuracy score on a state level of an association of a geographic location associated with the determined geographic center of a cluster (the contributing point) with the IP address, or defined range of IP addresses, shared by the registered users of the cluster. Generally, an accuracy score on a state level is determined by dividing a total number of registered users of the cluster in a state 802 that is also the state associated with the determined geographic center 804 of the cluster 806 by the total number of registered users in the cluster 806.

In FIG. 8, twenty registered users of the cluster are in the state that is also the state associated with the determined geographic center 804 of the cluster 806. Further, there is a total of twenty-one registered users in the cluster 806. Therefore, the accuracy score is determined by dividing twenty by twenty-one. Accordingly, the accuracy score on a state level of the geographic location associated with the IP address, or defined range of IP addresses, shared by the registered users of the cluster 806 is 95.2%.

In addition to associating a geographic location with an IP address based on user activity associated with registered users, a geographic location may be associated with an IP address based on user activity associated with browser cookies. FIG. 9 is a block diagram of one embodiment of a system for associating a geographic location with an IP address based on user activity associated with browser cookies. Similar to the system 200 of FIG. 2, the system 900 includes a search engine 902, a website provider 904, an ad provider 906, an ad campaign management system 908, and an IP address to location module 910.

A browser cookie is typically a small text file that a website provider 904 serves to a user. The browser cookie is stored locally by the user and is sent to the website provider 904 whenever the user requests a subsequent webpage from the website provider 904. One use of browser cookies is to set a geographic location for a user with a webpage such as a webpage that provides local weather to a user or a webpage that provides local telephone listings to a user. Therefore, when a user returns to the webpage, the user is automatically provided with local weather, or the user may search for local telephone listings without having to again identify a geographic location of the user.

The search engine 902 and/or website provider 904 may receive one or more browser cookies when a user submits a search query or requests a webpage. The search engine 902, the website provider 904, and/or the ad provider 906 may monitor and record user activity associated with received browser cookies. For example, for each browser cookies received, the search engine 902, the website provider 904, and/or the ad provider 906 may record webpage requests or search requests received with a browser cookie, search listings or digital ads served to a user in response to a request with a browser cookie, which search listings or digital ads a user clicks on after sending a request with a browser cookie, or any other activity associated with a browser cookie desired by the search engine 902, the website provider 904, and/or the ad provider 906. Similarly, the search engine 902, the website provider 904, and/or the ad provider 906 may monitor and record IP addresses associated with received browser cookies.

The IP address to location module 910 processes the recorded user activity and IP addresses associated with the received browser cookies to associate a geographic location with an IP address. FIG. 10 is a flow chart of one embodiment of a method for associating a geographic location with an IP address based on user activity associated with browser cookies. The method 1000 begins with a plurality of users interacting with a search engine and/or a website provider which results in a browser cookie being set with the user that identifies a geographic location such as a home address or a business address of a user at step 1002. The search engine, website provider, and/or ad provider monitor and record activity associated with the plurality of browser cookies and associated users at step 1004. For example, the search engine and/or website provider may monitor and record the types of search queries associated with a browser cookies, viewed webpages associated with a browser cookie, purchased products and service associated with a browser cookie, and an IP address associated a browser cookie. In one implementation, the search engine, website provider, and/or ad provider records activity associated with browser cookies in search logs.

An IP address to location module associates a geo tag with each of the browser cookies and associated users at step 1006 based on the geographic location, such as the home address or business address, identified in the browser cookie. Generally, a geo tag may be an identifier assigning a longitude and latitude coordinate to a geographic location such as a home address or business address with a browser cookie. One example of systems and methods for indexing data such as associating a geo tag with a geographic location such as a home address or business address identified in a browser cookie is disclosed in U.S. patent application Ser. No. 10/982, 629, filed Nov. 4, 2004, and assigned to Yahoo! Inc.

In some implementations, the IP address to location module reviews records associated with the plurality of browser cookies and associated users to remove any duplicate entries for multiple browser cookies associated with the same user at step 1008. After removing any duplicate entries, the IP address to location modules identifies one or more subsets of the plurality of browser cookies and associated users at step 1010. Each subset of the plurality of browser cookies and associated users is associated with the same IP address, or a defined range of IP addresses.

The IP address to location module examines a subset of the plurality of browser cookies and associated users to determine a geographic location associated with the IP address, or defined range of IP addresses, of the subset. Initially, the IP address to location module may examine the number of browser cookies and associated users in the subset to determine if the number of browser cookies and associated users in the subset exceeds a quorum threshold at step 1012.

If the IP address to location module determines the number of browser cookies and associated users in the subset does not exceed the quorum threshold (1014), the IP address to location module may add browser cookies and associated users to the subset that are associated with an adjoining IP address at step 1016 so that the number of browser cookies and associated users in the subset exceeds the quorum threshold.

If the IP address to location module determines the number of browser cookies and associated users in the subset exceeds the quorum threshold (1017), or after adding browser cookies and associated users to the subset so that the number of browser cookies and associated users in the subset exceeds the quorum threshold at step 1016, the method proceeds to step 1018. In some implementations, the IP address to location module may normalize a weight associated with browser cookies and associated users at step 1018. As discussed above, normalizing a weight associated with browser cookies allows the IP address to location module to adjust the weight of each browser cookie in determining a geographic location associated with an IP address based on factors such as the population density of a geographic location associated with a browser cookie. If the weight associated with the browser cookies is not normalized, it is likely that a geographic location associated with an IP address will regularly be biased towards a geographic location with a high population density, such as a large city. To address this issue, an IP address to location module may normalize a weight associated with a browser cookies so that users submitting browser cookies that are located in a highly populated area have less weight in determining a geographic location associated with an IP address than users submitting browser cookies that are located in sparsely populated areas. However, in other implementations, the IP address to location module does not normalize a weight associated with browser cookies and associated uses so that each browser cookie and associated user has an equal weight in determining a geographic location associated with an IP address.

The IP address to location module creates a spatial cluster for a subset at step 1020 as described above with respect to FIGS. 3 and 4. In one implementation, the IP address to location module creates a spatial cluster by associating all browser cookies and associated users with geo tags that are located within a predefined distance of a geo tag of another browser cookies and associated user of the cluster. However, other algorithms for creating spatial clusters known in the art may be used.

After the IP address to location module creates a spatial cluster for the subset, the IP address to location module determines a contributing point near the geographic center of the cluster at step 1022. The IP address to location module then associates a geographic location of the determined geographic center of the cluster (the contributing point) with the IP address, or defined range of IP addresses, shared by the browser cookies and associated users of the cluster at step 1024. The geographic location associated with the geographic center of the cluster may be a street, a zip code, a neighborhood, a city, a state, a DMA, or any other geographic location. For example, if all browser cookies and associated users of a cluster are associated with a single IP address, the IP location module may associate a zip code associated with the determined geographic center of the cluster (the contributing point) with the single IP address. Similarly, if all browser cookies and associated users of a cluster are associated with one of two sequential IP addresses, the IP location module may associate a zip code associated with the determined geographic center of the cluster (the contributing point) with the two sequential IP addresses.

The IP address to location module may determine an accuracy score at step 1026 of the geographic location associated with the IP address, or defined range of IP addresses, shared by the browser cookies and associated users of the cluster at step 1024. Similar to that described above with respect to FIGS. 5-8, the IP address to location module may determine the accuracy score on a street level, a zip code level, a city level, a DMA level, a state level, a country level, or any other geographic level desired by a search engine and/or web provider.

In addition to associating a geographic location with an IP address based on user activity associated with registered users or user activity associated with browser cookies, a geographic location may be associated with an IP address based on a local intent of search queries received at a search engine. FIG. 11 is a block diagram of one embodiment of a system for associating a geographic location with an IP address based on a local intent of search queries received at a search engine. Similar to the systems 200, 900 of FIGS. 2 and 9, the system 1100 includes a search engine 1102, a website provider 1104, an ad provider 1106, an ad campaign management system 1108, and an IP address to location module 1110.

A local intent of a search query indicates a degree of confidence that a user submitting the search query desires search results relating to the location of the user. For example, a search query "Dentist Pasadena" has a high local intent because a user submitting the search query is likely located in or near Pasadena, Calif. and searching for a local dentist. It will be appreciated that for a search query to have a high local intent, it is not necessary for the search query to include an explicit location. For example, a search query of "Dentist" has a higher local intent than a search query of "Holiday" because a user submitting the search query "Dentist" is more likely to require a local dentist than a user submitting the search query "Holiday" requiring a local holiday.

As the search engine 1102 receives search queries from a plurality of users, the search engine 1102 determines a local intent of the search queries and records information such as the search query, a local intent associated with the search query, and an IP address associated with the search query. The IP address to location module 1110 processes the recorded search queries, local intent of each of the search queries, and IP address associated with the received search queries to associate a geographic location with an IP address. FIG. 12 is a flow chart of one embodiment of a method for associating a geographic location with an IP address based on a local intent of search queries received at a search engine.

The method 1200 begins at step 1202 with a search engine receiving a plurality of search queries from users and recording information associated with the received search queries. The IP address to location module determines a plurality of localized search queries of the plurality of receive search queries at step 1204. In one implementation, the IP address to location module determines the plurality of localized search queries based on whether each search query contains an explicit geographic location and a term that is known to have a high degree of local intent.

Examples of systems and methods for identifying whether a search query includes an explicit geographic location are disclosed in U.S. patent application Ser. No. 10/680,495 (still pending), filed Oct. 7, 2003 and assigned to Yahoo! Inc., the entirety of which is hereby incorporated by reference. Generally, as described in U.S. patent application Ser. No. 10/680, 495 (still pending), to determine an explicit geographic location in a search query, the search query is parsed into text including a name of a geographic location and text that does not include a name of a geographic location. An explicit geographic location associated with the search query is then determined based on factors such as one or more names of geographic locations in the search query; whether for any of the names of geographic locations in the search query, multiple geographic locations exist with the same name; relationships between any of the geographic locations named in the search query; and relationships between the geographic locations named in the search query and the text of the search query that does not include a name of a geographic location.

Examples of systems and methods for determining whether a term has a high degree of local intent are disclosed in U.S. patent application Ser. No. 11/729,103 (still pending), titled "System for Providing Geographically Relevant Content to a Search Query with Local Intent;" U.S. patent application Ser. No. 11/729,104 (still pending), titled "System for Determining the Geographic Range of Local Intent in a Search Query;" and U.S. patent application Ser. No. 11/729, 096 (still pending), titled "System for Determining Local Intent in a Search Query," each of which were filed Mar., 28, 2007, and assigned to Yahoo! Inc., the entirety of each of which is hereby incorporated by reference. Generally, as described in U.S. patent application Ser. Nos. 11/729,103, 11/729,104, and 11/729,096, potentially millions of search queries are examined to establish which terms in search queries tend to be associated with locations that are near a location of a user submitting the search query. For example, if many search queries show that users search for the term "Dentist" in locations near where the users are located, such as a search query "Dentist Pasadena " for a user located in Pasadena, the term "Dentist" is deemed to have a high local intent. Similarly, if many search queries show that users search for the term "Pizza Delivery" in locations near where the users are located, such as a search query "Pizza Delivery Lincoln Park" for a user located in Lincoln Park, the term "Pizza Delivery" is deemed to have a high local intent. Conversely, if many search queries show that users search for the term "Flight" in locations that are not necessarily near locations where users are located, such as a search query "Flight Hawaii" for a user located in Chicago, the term "Flight" is deemed to have a low local intent. In one implementation, a degree of local intent of a term may be assigned a value on a scale of zero to one, with a local term such as "Dentist" assigned a value near one, and a less local term such as "DVD" assigned a value near zero.

After determining the plurality of localized search queries, the IP address to location module associates a geo tag with each of the localized search queries at step 1206. Generally, the IP address to location module associates a longitude and latitude coordinate to the localized search query based on the explicit geographic location in the localized search query. For example, the IP address to location module may associate a longitude and latitude of Pasadena, California for the search query "Dentist Pasadena." Examples of systems and methods for indexing data such as associating a geo tag with an explicit geographic location are disclosed in U.S. patent application Ser. No. 10/982,629 (now abandoned), filed Nov. 4, 2004, and assigned to Yahoo! Inc.

The IP address to location module determines one or more subsets of the plurality of localized search queries at step 1208. Each subset of the plurality of localized search queries is associated with the same IP address, or a defined range of IP addresses.

The IP address to location module examines a subset of the plurality of localized search queries to determine if the number of search queries in the subset exceeds a quorum threshold at step 1212. If the IP address to location module determines the number of search queries in the subset does not exceed the quorum threshold (1214), the IP address to location module may add search queries to the subset that are associated with an adjoining IP address at step 1216 so that the number of search queries in the subset exceeds the quorum threshold.

If the IP address to location module determines the number of search queries in the subset exceeds the quorum threshold (1217), or after adding localized search queries to the subset so that the number of localized search queries in the subset exceeds the quorum threshold at step 1216, the method proceeds to step 1218. In some implementations, the IP address to location module may normalize a weight associated with localized search queries at step 1218. As discussed above, an IP address to location module may normalize a weight associated with a localized search query to adjust the weight of the localized search query in determining a geographic location associated with an IP address based on factors such as the population density of a geographic location associated with a localized search query. If the weight associated with the localized search query is not normalized, it is likely that a geographic location associated with an IP address will regularly be biased towards a geographic location with a high population density, such as a large city. To address this issue, an IP address to location module may normalize a weight associated with a localized search query at step 1218 so that localized search queries associated with a geographic location that is highly populated will have less weight in determining a geographic location associated with an IP address than search queries associated with a geographic location that is sparsely populated. However, in other implementations, the IP address to location module does not normalize the weight associated with the search queries so that each search query has an equal weight in determining a geographic location associated with an IP address.

The IP address to location module creates a spatial cluster of a subset of the plurality of localized search queries at step 1220 as described above with respect to FIGS. 3 and 4. In one implementation, the IP address to location module creates a spatial cluster by associating all localized search queries of the subset with a geo tag that is located within a predefined distance of a geo tag of another localized search query of the cluster. However, other algorithms for creating spatial clusters know in the art may be used.

After the IP address to location module creates a spatial cluster, the IP address to location module determines a contributing point near the geographic center of the cluster at step 1222. The IP address to location module then associates a geographic location of the determined geographic center of the cluster (the contributing point) with the IP address, or defined range of IP addresses, shared by the localized search queries of the cluster at step 1224. The geographic location associated with the geographic center of the cluster may be a street, a zip code, a neighborhood, a city, a state, a DMA, or any other geographic location. For example, if all localized search queries of a cluster are associated with a single IP address, the IP location module may associate a zip code associated with the determined geographic center of the cluster (the contributing point) with the single IP address. Similarly, if all localized search queries of a cluster are associated with one of two sequential IP addresses, the IP location module may associate a zip code associated with the determined geographic center of the cluster (the contributing point) with the two sequential IP addresses.

The IP address to location module may additionally determine an accuracy score at step 1226 of the geographic location associated with the IP address, or defined range of IP addresses, shared by the localized search queries of the cluster at step 1224. Similar to that described above with respect to FIGS. 5-8, the IP address to location module may determine the accuracy score on a street level, a zip code level, a city level, a DMA level, a state level, a country level, or any geographic level desired by a search engine and/or web provider.

An illustrative example of the above-described method is described below. Table 1 is an example of a set of search queries received at a search engine.

TABLE 1

| IP Address | Search Query | Local Intent |
| --- | --- | --- |
| 217.12.14.240 | Dentist London | 0.88 |
| 217.12.14.240 | Florist West End | 0.89 |
| 217.12.14.241 | Park London | 0.82 |
| 217.12.14.241 | Café New York | 0.79 |
| 217.12.14.242 | Bar Shaftesbury Ave | 0.77 |
| 217.12.14.242 | Flight Paris | 0.38 |
| 217.12.14.242 | Flight Hawaii | 0.00 |
| 217.12.14.243 | Visual Basic | 0.00 |
| 217.12.12.243 | Perl Reference | 0.00 |
| 217.12.14.243 | Lost | 0.18 |

In Table 1, six search queries are determined to be highly localized search queries (shown in bold) with an explicit location and a high local intent. When geo tags are associated with the highly localized search queries and the highly localized search queries are clustered as described above, five of the six search queries with explicit locations and a high local intent (shown in bold and italics) refer to London. Accordingly, an IP address to location module can determine there is a high likelihood that the IP address range of 217.12.14.240 to 217.12.14.242 is located in London since the majority of queries having explicit location terms and high local intent non-location terms have similar or same IP addresses.

FIGS. 1-12 disclose systems and methods for associating a geographic location with an IP address based on user activity associated with registered users, user activity associated with browser cookies, and a local intent of search queries received at the search engine. In some implementations, an IP address to location module such as those described above with respect to FIGS. 1-12 may additionally merge IP address to location data created using two or more different methods to create a master IP address to location data set including reliable associations between geographic locations and IP addresses.

FIGS. 13 and 14 illustrate embodiments of methods for merging IP address to location data from multiple sources. As described in more detail below, FIG. 13 illustrates a method for merging IP address to location data from two sources and FIG. 14 illustrates a method for merging IP address to location data from more than two sources.

Referring to FIG. 13, the method 1300 begins with an IP address to location module identifying a first IP address to location data set and a second IP address to location data set at step 1301. It will be appreciated that the IP address to location module may create the first and/or the second IP address to location data sets using methods such as those described above with respect to FIGS. 1-12, or the IP address to location module may receive the first and/or the second IP address to location sets from another source, such as another IP address to location module.

The IP address to location module examines associations between geographic locations and IP addresses in the first IP address to location data set and/or the second IP address to location data set, and calculates an accuracy score for one or more associations between geographic locations and IP addresses of the first and/or second IP address to location data sets at step 1302. The first and second IP address to location data sets include associations of geographic locations with IP addresses based on data such as user activity associated with registered users, user activity associated with browser cookies, a local intent of search queries received at the search engine, or any other type of data available to an IP address to location module indicative of a geographic location associated with an IP address.

In some implementations, the IP address to location module may calculate an accuracy score for each association of a geographic location and an IP address, where in other implementations, the IP address to location module may calculate an accuracy score for any association of a geographic location with an IP address which is not already associated with an accuracy score in the first and/or second IP address to location data sets.

Further, In some implementations, the accuracy score may be calculated as described above with respect to FIGS. 5-8, but other accuracy scores may also be used. The IP address to location module may determine the accuracy score on a street level, a zip code level, a city level, a DMA level, a state level, a country level, or any geographic level desired by a search engine and/or web provider.

At step 1304, the IP address to location module may normalize the accuracy scores across the first and second IP address to location data sets when the accuracy scores of the first IP address to location data set and the accuracy scores of the second IP address to location data set have been calculated differently. In one implementation, the accuracy scores of the first and second IP address to location data sets are normalized based on the scale and distribution of the accuracy numbers so that the normalized accuracy scores become comparable between the first and second IP address to location data sets. However, in other implementations, the IP address to location module may not normalize the accuracy scores across the first and second IP address to location data sets.

At step 1306, the IP address to location module may expand the first and/or second IP address to location data sets. To expand the first and/or second IP address to location data sets, the IP address to location module identifies IP addresses within a relevant IP address range being processed that are not associated with a geographic location. For each identified IP address within the relevant IP address range that is not associated with a geographic location, the IP address to location module may assign a geographic location to the identified IP address based on factors such as other associations of geographic locations with IP addresses within the same IP to location data set or whether the identified IP address is associated with router of an Internet Service Provider where the router is also associated with another IP address where a geographic location associated with the other IP address is known.

For example, if the IP address to location module determines that the IP address 217.12.14.240 is not associated with a geographic location in the first IP address to location data set, the IP address to location module identifies geographic locations associated with surrounding IP addresses in the first IP address to location data set. For example, if the IP address to location module determines the IP address 217.12.14.238 is associated with the location Chicago, Ill. in the first IP address to location data set, and determines the IP address 217.12.14.241 is associated with the location Chicago, Ill. in the first IP address to location data set, the IP address to location module may associate the location Chicago, Ill. with the IP address 217.12.14.240 in the first IP address to location data set. However, it should be appreciated that it is not necessary for the IP address to location module to identify the same geographic location on either side of an IP address that is not associated with a geographic location in an IP address to location data set to assign a geographic location to the IP address that is not associated with a geographic location.

At step 1308, the IP address to location module determines whether a geographic location associated with an IP address in the first IP address to location data set is the same as a geographic location associated with the same IP address in the second IP address to location data set. If the geographic location associated with the IP address is the same in the first and second IP address to location data sets (branch 1310), the IP address is associated with the geographic location in a master IP to location data set at step 1312 and the method proceeds to step 1332. However, if the geographic location associated with the IP address in the first. IP address to location data set is not the same as the geographic location associated with the IP address in the second IP address to location data set (branch 1313), the method proceeds to step 1314.

At step 1314, the IP address to location module determines whether the accuracy score associated with the association of the geographic location with the IP address in the first IP address to location data set is higher than the accuracy score associated with the association of the geographic location with the IP address in the second IP address to location data set. If the accuracy scores are different (branch 1316), the IP address to location module associates the geographic location associated with the higher accuracy score to the IP address in the master IP address to location data set at step 1318 and the method proceeds to step 1332. However, if the accuracy scores are substantially equal, or within a predetermined percentage of each other (branch 1320), the method proceeds to step 1322.

At step 1322, the IP address to location module determines whether there is a geographic location associated with an adjacent IP address in the master IP address to location data set. If there is a geographic location associated with an adjacent IP address in the master IP address to location data set (branch 1324), the IP address to location module associates a geographic location with the IP address in the master IP address to location data set based on the geographic location associated with the adjacent IP address in the master IP address to location data set at step 1326 and the method proceeds to step 1332.

However, if there is not a geographic location associated with an adjacent IP address in the master IP address to location data set (branch 1328), the IP address to location module may associate an "UNKNOWN" identifier with the IP address in the master IP address to location data set at step 1330 and the method proceeds to step 1332.

At step 1332, the IP address to location module determines whether there are additional IP addresses within the relevant IP address range to process. If there are additional IP addresses to process (branch 1334), the method loops to step 1308 and the above-described process is repeated for the next IP address to be processed. However, if there are no additional IP addresses to process (branch 1336), the method proceeds to step 1338.

At step 1338, the IP address to location module may group adjacent IP addresses within the master IP address to location data set that are associated with a common geographic location to form logical groups, and the method ends.

While the method described with respect to FIG. 13 merges IP address to location data from two IP address to location data sets, the method described below with respect to FIG. 14 merges IP address to location data from more than two IP address to location data sets. While the method described below is described with respect to a first, second, and third IP address to location data sets, it should be appreciated that the same method may be implemented with any number of IP address to location data sets that is more than two.

Referring to FIG. 14, the method 1400 begins with an IP address to location module identifying a first IP address to location data set, a second IP address to location data set, and a third IP address to location data set at step 1401. It will be appreciated that the IP address to location module may create the first, second and/or third IP address to location data sets using methods such as those described above with respect to FIGS. 1-12, or the IP address to location module may receive the first, second and/or third IP address to location sets from another source, such as another IP address to location module.

The IP address to location module examines associations between geographic locations and IP address in the first, second, and/or third IP address to location data set, and calculates an accuracy score for one or more associations between geographic location and IP addresses in the first, second, and/or third IP address to location data sets at step 1402.

At step 1404, the IP address to location module may normalize the accuracy scores across the first, second and third IP address to location data sets. Further, at step 1406, the IP address to location module may expand the first, second, and/or third IP address to location data sets as explained above.

At step 1408, the IP address to location module examines a geographic location associated with an IP address in the first IP address to location data set, a geographic location associated with the same IP address in the second IP address to location data set, and a geographic location associated with the same IP address in the third IP address to location data set to determine whether a geographic location exists that is associated with a majority of the IP address to location data sets. For example, with respect to the first, second, and third IP address to location data sets, the IP address to location module determines whether a geographic location is associated with the same IP address in at least two of the three IP address to location data sets.

If a geographic location exists that is associated with the IP address in a majority of the IP address to location data sets (branch 1410), the IP address to location module associates the geographic location with the IP address in the master IP address to location data set at step 1412 and the method proceeds to step 1426. However, if a geographic location does not exist that is associated with the IP address in a majority of the IP address to location data sets (branch 1414), the method proceeds to step 1416.

At step 1416, the IP address to location module determines whether an accuracy score of one of the associations of a geographic location and the IP address in the first, second, and third IP address to location data sets is greater than a predetermined percentage of the accuracy score of the other associations of a geographic location and the IP address in the first, second, or third IP address to location data sets. For example, the IP address to location module may determine whether the accuracy score of an association between a geographic location and an the IP address in the first IP address to location data set ("the first accuracy score") is greater than a predetermined percentage of both the accuracy score of an association between a geographic location and the IP address in the second IP address to location data set ("the second accuracy score") and the accuracy score of an association between a geographic location and the IP address in the third IP address to location data set ("the third accuracy score").

If an accuracy score of one of the first, second, and third accuracy scores is greater than a predetermined percentage of the other two accuracy scores (branch 1418), the IP address to location module associates the geographic location of the high accuracy score with the IP location in the master IP address to location data set at step 1420 and the method proceeds to step 1426. However, if an accuracy score of the first, second, and third accuracy scores is not greater than a predetermined percentage of the other two accuracy scores (branch 1422), the IP address to location module may associate an "UNKNOWN" identifier with the IP address in the master IP address to location data set at step 1424 and the method proceeds to step 1426.

At step 1426, the IP address to location module determines whether there are additional IP addresses within the relevant IP address range to process. If there are additional IP addresses to process (branch 1428), the method loops to step 1408 and the above-described process is repeated for the next IP address to be processed. However, if there are no additional IP addresses to process (branch 1430), the method proceeds to step 1432.

At step 1432, the IP address to location module may group adjacent IP addresses within the master IP address to location data set that are associated with a common geographic location to form logical groups, and the method ends.

By merging IP address to location data from multiple sources, the IP address to location module is able to provide more accurate associations between geographic locations and IP addresses to search engines or online advertisement service providers to provide the ability to better target search results and digital ads based on a location of a user. Therefore, when an Internet search engine receives a subsequent search query, the Internet search engine may determine a location of the user submitting the search query based on the association between the geographic location and the IP address received from the IP address to location model. The Internet search engine may then return search results relating to the search query specifically tailored to the location of the user submitting the search query. Similarly, when an ad provider receives a digital ad request, the ad provider may determine a location of the user that will receive the digital ads based on the association between the geographic location and the IP address received from the IP address to location module. The ad provider may then return digital ads such as sponsored search listings or graphical banner ads tailored to the location of the user receiving the digital ads. For example, the ad provider may serve digital ads relating to products and services actually available near the geographic location of the user receiving the digital ads.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for associating a geographic location with an Internet protocol address (IP address), the method comprising:

determining, with an IP address to location module comprising a processor and a computer-readable storage medium, whether a first geographic location associated with a first IP address in a first IP address to location data set is the same as a second geographic location associated with the first IP address in a second IP address to location data set; and storing, with the IP address to location module, an association between a geographic location and the first IP address in a third IP address to location data set based at least on the determination of whether the first and second geographic locations are the same;

wherein storing an association between a geographic location and the first IP address in a third IP to location data set based at least on the determination of whether the first and second geographic locations are the same comprises:

determining, with the IP address to location module, that the first and second geographic locations are not the same; and determining, with the IP address to location module, whether a first accuracy score associated with the first geographic location and the first IP address is greater than a second accuracy score associated with the second geographic location and the first IP address in response to determining that the first and second geographic locations are not the same; and storing, with the IP address to location module, an association between a geographic location and the first IP address in the third IP address to location data set based at least on the determination of whether the first and second geographic locations are the same and the determination of whether the first accuracy score is greater than the second accuracy score.

2. The computer-implemented method of claim 1, wherein storing an association between a geographic location and the first IP address in the third IP address to location data set based at least on the determination of whether the first and second geographic locations are the same and the determination of whether the first accuracy score is greater than the second accuracy score comprises:

determining, with the IP address to location module, that the first accuracy score is within a predetermined percentage of the second accuracy score;

identifying, with the IP address to location module, an association of a third geographic location and a second IP address in the third IP address to location data set in response to the determination that the first accuracy score is within a predetermined percentage of the second accuracy score, wherein the second IP address is adjacent to the first IP address; and storing, with the IP address to location module, an association between a geographic location and the first IP address in the third IP address to location data set based on at least the first, second, and third geographic locations.

3. The computer-implemented method of claim 1, wherein storing an association between a geographic location and the first IP address in the third IP address to location data set based at least on the determination of whether the first and second geographic locations are the same and the determination of whether the first accuracy score is greater than the second accuracy score comprises:

determining, with the IP address to location module, the first accuracy score is greater than the second accuracy score; and storing, with the IP address to location module, an association between the first geographic location and the first IP address in the third IP address to location data set.

4. The computer-implemented method of claim 1, further comprising:

expanding, with the IP address to location module, at least one of the first IP address to location data set and the second IP address to location data set.

5. The computer-implemented method of claim 1, further comprising:

normalizing, with the IP address to location module, the first and second accuracy scores.

6. The computer-implemented method of claim 1, further comprising:

grouping, with the IP address to location module, adjacent IP addresses associated with common geographic locations in the third IP address to location data set into logical groups.

7. A computer-readable storage medium comprising a set of instructions for associating a geographic location with an Internet protocol address (IP address), the set of instructions to direct a processor to perform acts of:

determining whether a first geographic location associated with a first IP address in a first IP address to location data set is the same as a second geographic location association with the first IP address in a second IP address to location data set; and storing an association between a geographic location and the first IP address in a third IP address to location data set based at least on whether the first and second geographic locations are the same;

wherein storing an association between a geographic location and the first IP address in a third IP to location data set based at least on whether the first and second geographic locations are the same comprises:

determining that the first and second geographic locations are not the same;

determining whether a first accuracy score associated with the first geographic location and the first IP address is greater than a second accuracy score associated with the second geographic location and the first IP address in response to determining that the first and second geographic locations are not the same; and storing an association between a geographic location and the first IP address in the third IP address to location data set based at least on the determination of whether the first and second geographic locations are the same and the determination of whether the first accuracy score is greater than the second accuracy score.

8. The computer-readable storage medium of claim 7, wherein storing an association between a geographic location and the first IP address in the third IP address to location data set based at least on the determination of whether the first and second geographic locations are the same and the determination of whether the first accuracy score is greater than the second accuracy score comprises:

determining that the first accuracy score is within a predetermined percentage of the second accuracy score;

identifying an association of a third geographic location and a second IP address in the third IP address to location data set in response to the determination that the first accuracy score is within a predetermined percentage of the second accuracy score, wherein the second IP address is adjacent to the first IP address; and storing an association between a geographic location and the first IP address in the third IP address to location data set based on at least the first, second, and third geographic locations.

9. The computer-readable storage medium of claim 7, wherein storing an association between a geographic location and the first IP address in the third IP address to location data set based at least on the determination of whether the first and second geographic locations are the same and whether the first accuracy score is greater than the second accuracy score comprises:

determining the first accuracy score is greater than the second accuracy score; and storing an association between the first geographic location and the first IP address in the third IP address to location data set.

* * * * *